United States Patent [19]

Barchenko

[11] 4,149,374
[45] Apr. 17, 1979

[54] JET PROPULSION ENGINE ASSEMBLY FOR AIRCRAFT

[76] Inventor: Mark R. Barchenko, 7 Belair Ter., Wayne, N.J. 07470

[21] Appl. No.: 818,422

[22] Filed: Jul. 25, 1977

[51] Int. Cl.² ............................................. F02K 3/12
[52] U.S. Cl. ..................................... 60/225; 60/39.15
[58] Field of Search ..................... 60/224, 225, 226 R, 60/39.15

[56] References Cited

U.S. PATENT DOCUMENTS

| | | | |
|---|---|---|---|
| 2,929,207 | 3/1960 | Peterson | 60/224 |
| 3,020,711 | 2/1962 | Pinnes | 60/39.15 |
| 3,307,351 | 3/1967 | Wheeler et al. | 60/39.15 |
| 3,368,352 | 2/1968 | Hewson | 60/224 |
| 3,442,082 | 5/1969 | Peterson | 60/224 |
| 3,659,422 | 5/1972 | Hope | 60/224 |

FOREIGN PATENT DOCUMENTS

| | | | |
|---|---|---|---|
| 1077919 | 3/1960 | Fed. Rep. of Germany | 60/224 |
| 246174 | 12/1946 | Switzerland | 60/224 |

*Primary Examiner*—Robert E. Garrett
*Attorney, Agent, or Firm*—Watson, Leavenworth, Kelton & Taggart

[57] ABSTRACT

A jet propulsion engine assembly for aircraft embodying a longitudinal tubular pod or nacelle housing having an open air intake nose. This assembly includes an axial air flow impeller supported longitudinally in the interior of and by the housing, and it has an annular array of rotary blades supported therein upon a rotatably supported, longitudinal and generally central shaft to force air from the intake nose longitudinally back toward the tail end of said housing. A central jet engine within this housing has a longitudinal drivable shaft substantially aligned with the impeller shaft and drivably connected thereto by disengageable clutching means for effecting drive of the latter from the former when the engine shaft is power driven by the central engine. A plurality of flanking jet engines also have longitudinal drivable shafts arranged within said housing substantially equally offset laterally from the central engine while being annularly spaced substantially equal radial angles apart with ther shafts also connected to the impeller shaft by independent disengageable clutching means whereby each flanking engine and the central engine may be selectively disengaged from the impeller shaft independently of the others. The space within the housing downstream of the means which connects the impeller shaft to the shafts of the plurality of jet engines is sub-divided into a plurality of separated longitudinal spaces which individually house the jet engines. Each of the jet engines has associated with its longitudinal drivable shaft upstream of this engine and downstream of the air flow impeller an individual cooperative upstream airflow door appreciably to close off airflow from the impeller back through the longitudinal housing space of this engine upon termination of combustion in the latter.

8 Claims, 5 Drawing Figures

JET PROPULSION ENGINE ASSEMBLY FOR AIRCRAFT

BACKGROUND AND SUMMARY

The present invention is concerned with a jet propulsion engine assembly for aircraft mounted within a longitudinal pod or nacelle housing. It is chiefly concerned with the enclosure in such housing having an open air intake nose and an openable tail end which preferably permits selective exhaust out of the latter from a plurality of operating jet propulsion engines housed therein.

In the prior art it has been proposed in the United States Griffith Pat. No. 3,153,907 of Oct. 27, 1964 to mount concentrically in a tubular outer casing a central tubular engine pod in which is clustered about the central axis of the latter a pair of diametrically spaced and longitudinally extending gas turbine engines. Longitudinal shafts of these engines are geared to a central longitudinal air impeller shaft downstream of the exhausts of the turbines of the pair of engines and within the gas flows from the latter to hazard heat injury to the gearing. These engines drive in opposite directions through such gearing a pair of coaxial fans within the tubular outer casing to force air rearward through the latter into which the engine exhaust gases flow. Such gaseous mixture is ultimately exhausted downwardly through openings in elongated zones of the bottom of the fuselage to provide some vertical lift. Accordingly, these proposals are not pertinent to the subjects matter claimed herein.

It is a general object of the present invention efficiently to embody in a longitudinal tubular housing having an open air intake nose, a typically conventional type of airflow impeller which may be of the compressor or fan blade types, or other obvious variants thereof, with the rotary blades of the impeller carried by a longitudinal central shaft driven from a central jet engine mounted within the housing having its longitudinal shaft aligned with the impeller shaft and drivably connected thereto by disengagable clutching means for drive of the impeller shaft by this engine when operating. This generic embodiment includes a plurality of flanking jet engines which respectively have drivable longitudinal shafts and are arranged annularly about the central engine at substantially equal radial angles apart with their shafts also drivably connected to the impeller shaft by independent disengagable clutching means so that each of the engines may be selectively disengaged from the impeller shaft upon inoperability of any of such engines. The drive shaft of each of the engines of this generic embodiment has associated therewith upstream of this engine and downstream of the impeller an individual cooperative upstream airflow door means so as appreciably to close off airflow from the impeller back through the housing space of this particular engine upon termination of combustion in the latter.

The jet power plants or engines proposed herein for employment in various embodiments of the present invention may be of a variety of types, e.g., turbojets, fanjets, and variations thereof. By way of example the present disclosure proposes the use of jet engines of the gas turbine type with the longitudinal shaft of each such engine being driven by its turbine.

When embodiments of the invention include the basic combinations of units or subassemblies indicated above it is important that the upstream doors of each jet engine are embodied to cooperate with the longitudinal shaft thereof for substantially closing off flow of pressurized air from the impeller back through the interior of such an engine when it becomes inoperative, such as by flame-out. However, although it may be desirable also to provide the downstream tail pipe exhaust opening of each of the engines with suitable closing doors, perhaps as a protective measure or stream lining function, this is not an essential feature.

It is desirable to provide engines of embodiments of the invention with air bleed-off systems to reduce the intake to thrust ratio when one or more of the engines is or are inoperable so that performance of the operating engines is not hampered.

Another object of the invention is to make provision for reducing the ratio of air intake into the tubular housing or nacelle in which the group of engines are mounted and operated to the thrust produced by the operating engines when one or more of the group are inoperable, so that performance of the operating engines is not undesirably hampered. In accordance with a feature of the present invention this may be accomplished satisfactorily by a selective air bleed-off system intervening the air impeller and the air intakes of the engines. Advantageously and uniquely this may be attained by incorporating with the upstream airflow door means of each of the flanking engines provision for bleeding off impeller-supplied pressurized air when the particular door means that is associated with a certain such engine that becomes inoperable is manipulated to closure of the upstream air intake of this particular engine. Such air bleeding-off means may include provision for directing such pressurized air at such door means to and out through an air escape outlet having direct communication with the atmosphere and which is operatively effective only upon closure of the upstream door means of this engine. More specifically, such certain door means may have a manipulative section which in one position closes this associated air escape outlet with simultaneous opening of the flow passage from the impeller back through the particular flanking engine, and vice versa.

An additional object of the invention is to provide advantageously such impeller-supplied air escape equipment with manipulative fairing means which will close off and cover advantageously the exterior escape outlet when the upstream airflow door means of a particular operating flanking engine is open to satisfy the air demand of this engine.

It may be desirable for some services to take advantage of the secondary thrust created by the impeller pressurized air at the rear of the tubular housing as it bypasses the flanking engines and the central engine, for supplementing the thrust of the combustion gases exiting from the tail pipes of the operating engines, such as in a fanjet type engine. The more the flanking engines which are clustered about the central engine, within the longitudinal tubular housing or nacelle, the lesser will be the flow through spaces at the open tail end of the housing. Other services may demand that such intervening spaces between the tail pipes of the engines and also between them and the nacelle housing be closed off by fairing skin of the housing which may be smoothly tapered from the open front end section back to the thrust nozzles provided by the open downstream ends of the tail pipes, such as in a turbojet type engine.

If thrust reversers are required for such an engine assembly, as may be the case for power plants of airliners, they readily may be installed and used without undue interference with the structures embodying features of the present invention and the functions of the latter. The functions of such thrust reversers may be embodied in downstream door means which may desirably function as closing doors when desired.

Other objects of the invention will in part be obvious and will in part appear from reference to the following detailed description taken in connection with the accompanying drawings, wherein like numerals identify similar parts throughout, and in which:

FIG. 1 is an axial section of a jet propulsion engine assembly of the present invention, in which are embodied various basic features of the present invention and illustrating a single airflow impeller in the open nose section of the tubular housing thereof, with the tail section provided with a central engine axially connected to the impeller rotor through a disengaging clutch and flanked on opposite sides by somewhat similar engines geared thereto through separate disengaging clutches;

Figure 3:
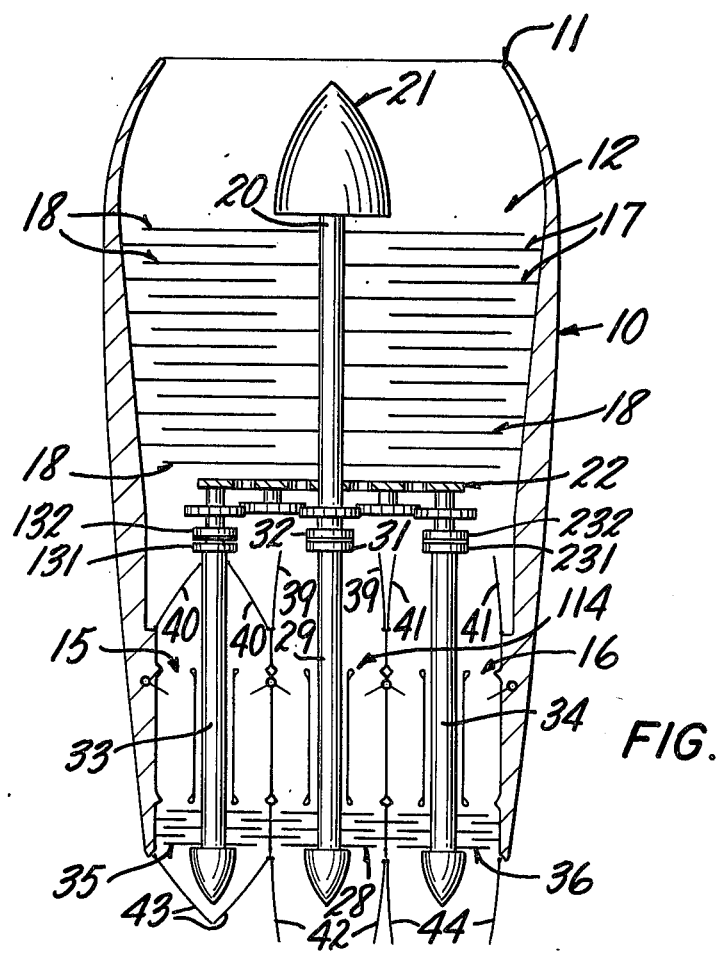
FIG. 3 is a diagrammatic illustration of the assembly of FIG. 1 from which has been omitted a showing of certain air escape outlet means, with one of the three engines being shown as shut down while the other two engines remain clutched to the impeller shaft.
Figure 4:
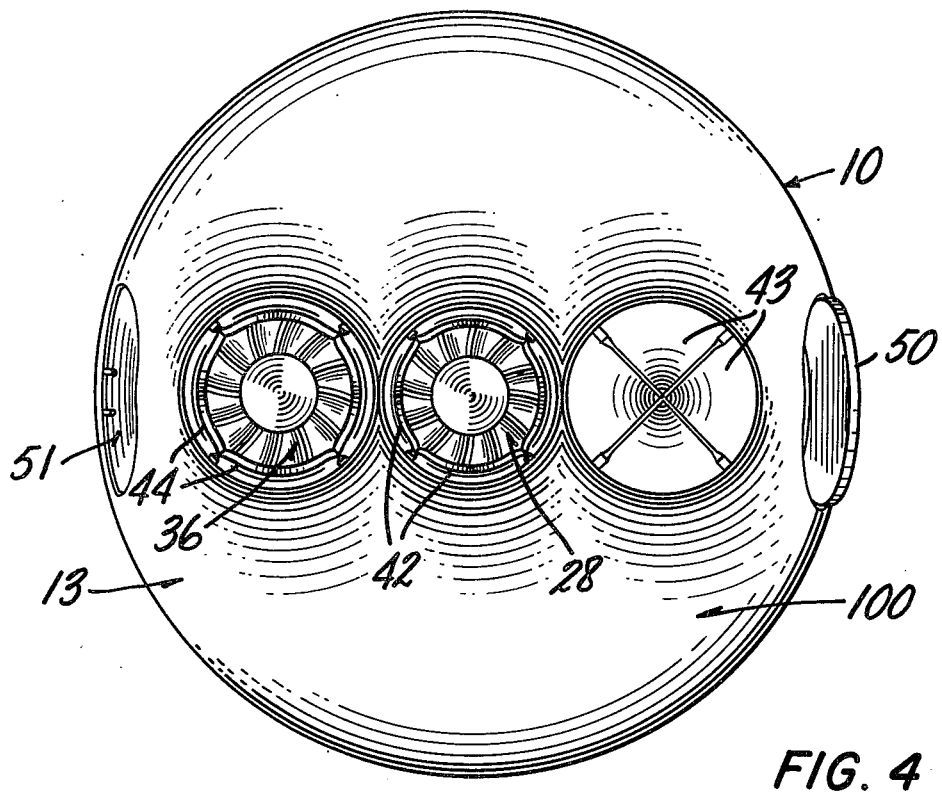
Figure 5:
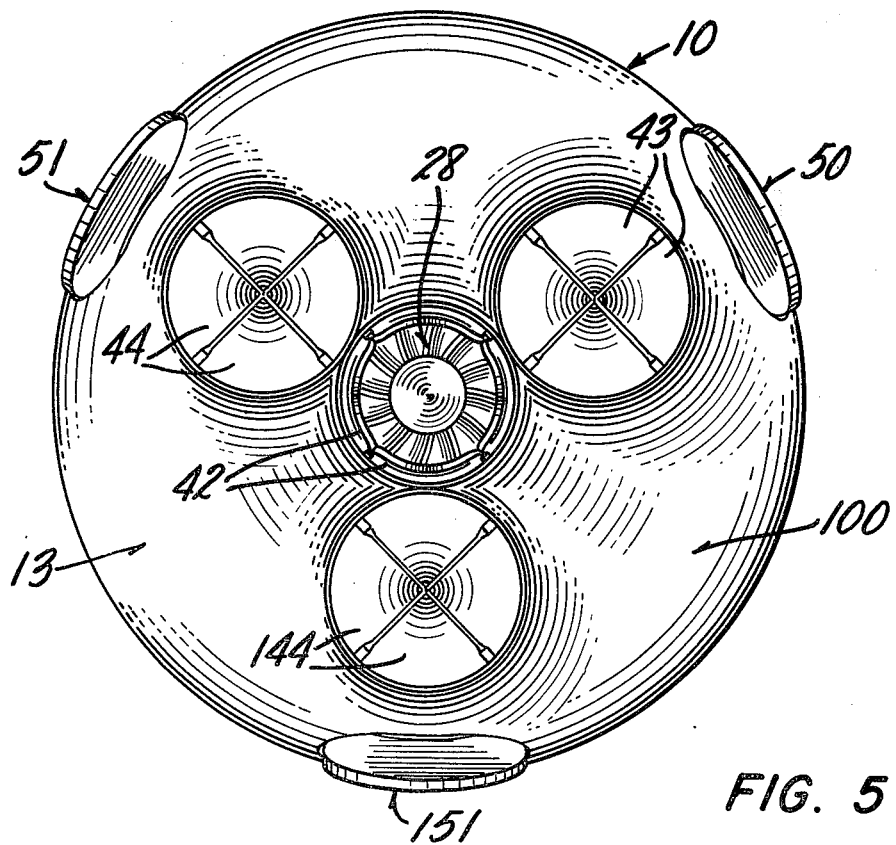

FIG. 4 is a tail end view of a jet propulsion engine assembly similar to that illustrated in FIG. 3, with the addition to the showing of the latter of the door means for the upstream airflow doors and escape outlets and also the addition thereto of fairing skin which closes off the tail end of the longitudinal tubular housing except for the tail end pipes of the three engines; and FIG. 5 is a tail end view of a jet propulsion engine assembly similar to that illustrated in FIG. 4 while featuring a cluster of three flanking jet engines arranged at equal angular distances about the central jet engine with only the latter being operative.

Figure 1:
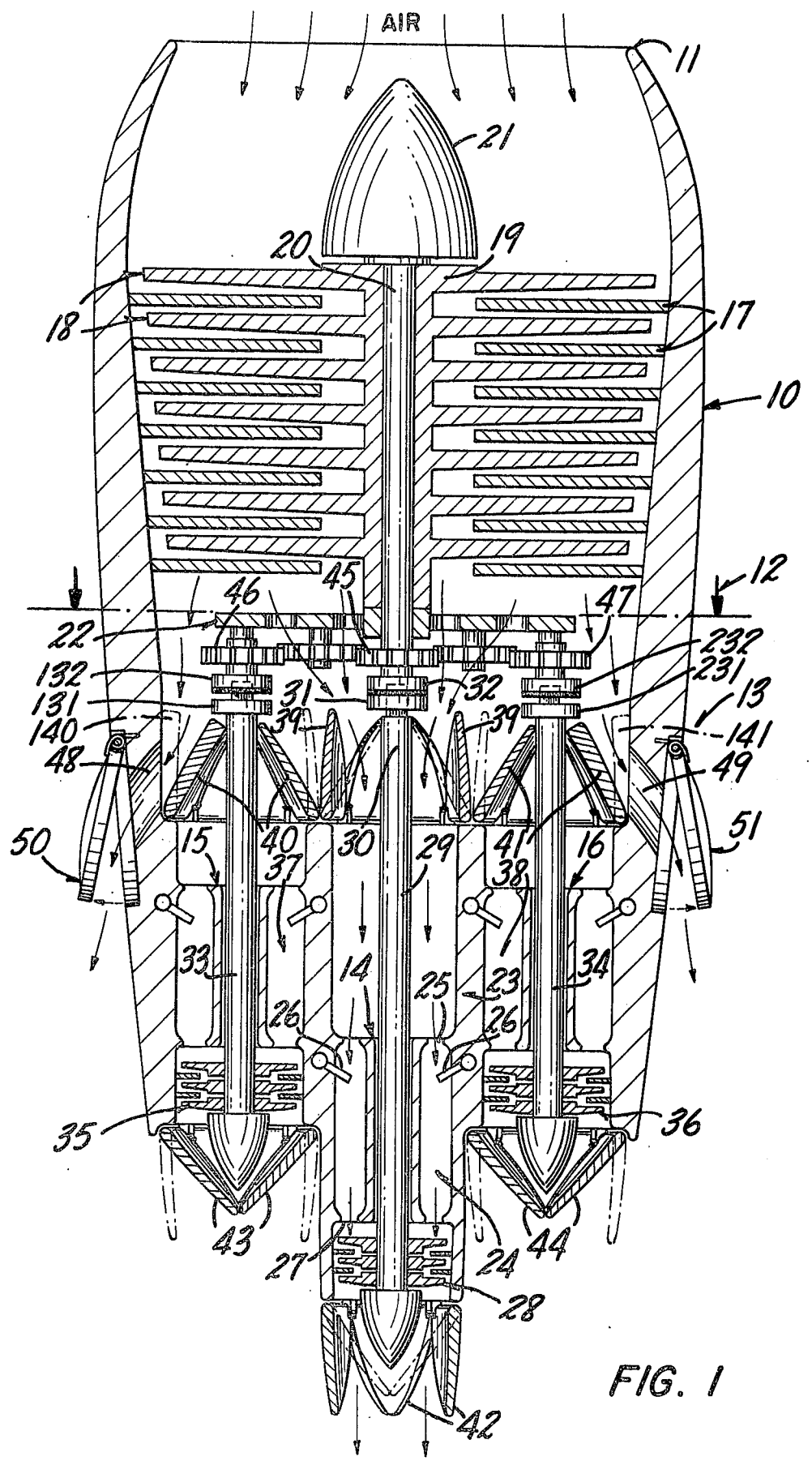

As is illustrated in FIG. 1, with some parts indicated diagrammatically with others which are of obvious character being omitted as unnecessary, it will be seen that the embodiment of the jet propulsion engine assembly for aircraft there illustrated has a longitudinal tubular housing 10 that serves as an enclosing pod or nacelle and having an open air intake opening 11 of a nose section 12. The remaining section 13 constitutes a tail section which embodies a cluster or plurality of jet engines including a central engine 14 and a pair of flanking engines 15 and 16.

The nose section 12 of the longitudinal tubular housing 10 carries fixed therein a stator structure 17 of conventional type, if desired, with the annular array of fixed blades thereof interdigitated between the rotor blades 18 carried by a central hub 19 about an axial shaft 20, which may be equipped on its air entrance end with a conical hub nose 21. The impeller shaft 20 is suitably rotatably supported by bridge work graphically represented by a perforated bridge plate 22 which may be suitably holed through to reduce to a minimum interference with airflow back from the nose section 12 into the tail section 13.

The tail section 13 is provided in any suitable manner with fixed structure which defines a cylindrical casing 23 of the central jet engine 14, with the interior of this casing communicating rearwardly with combustion chamber means 24 provided upstream with an entrance opening 25 for the impelled pressurized air from the impeller back into the combustion chamber. In the latter are located fuel supply nozzles 26, so that upon firing of such fuel the resulting hot gases exit from such combustion chamber means through exit passage 27 for driving rotatably gas turbine 28.

The gas turbine 28 is fixed upon a rotary central shaft 29 suitably rotatably supported in bearing means and with its upstream end 30 provided with a clutch driven element 31 suitably engaged by a clutch driving element 32 which is rotatably carried by the rotary impeller shaft 20. The disengagable clutching means 31-32 may be of conventional structure known in the art and so equipped as to separate the driving element 32 from the driven element 31 as may be dictated by any remote control for discontinuing rotation of the shaft 29 and the turbine rotor 28 carried thereby. Thus the central engine 14 carries its turbine rotor 28 for drive thereof and consequential drive of the shaft 29 for rotating the impeller rotor 18 through the engaged clutch 31-32.

Flanking engines 15 and 16 may be of generally similar construction as the central engine 14 with the shafts 33 and 34 thereof respectively driving rotors 35 and 36 of similar gas turbines which will be driven when such engines are fired up by combustion of fuel in their respective chambers 37 and 38. By way of example, it has been assumed that such flanking engines 15 and 16 have been rendered inoperative such as, for example, by flame-outs, so that there is at such time no need for flow of pressurized air back from the impeller through these flanking engines. It will thus be noted that the disengagable clutching means 131-132 and 231-232 have been disengaged, such as by suitable remote control means for discontinuing the longitudinal turbine-driving shafts 33 and 34 of these flanking engines 15 and 16.

Consequently, it is no longer desired to flow pressurized air from the impeller in the upstream impeller section 12 back through the flanking engines 15 and 16. Accordingly, it is desirable to discontinue such flow into such flanking engines by manipulating to closed conditions individual cooperative upstream airflow door means 40 and 41, as shown in FIG. 1. Since the central jet engine 14 remains operative its upstream door means 39 remains open for passage down into the combustion chamber 24 of this jet engine.

Figure 2:
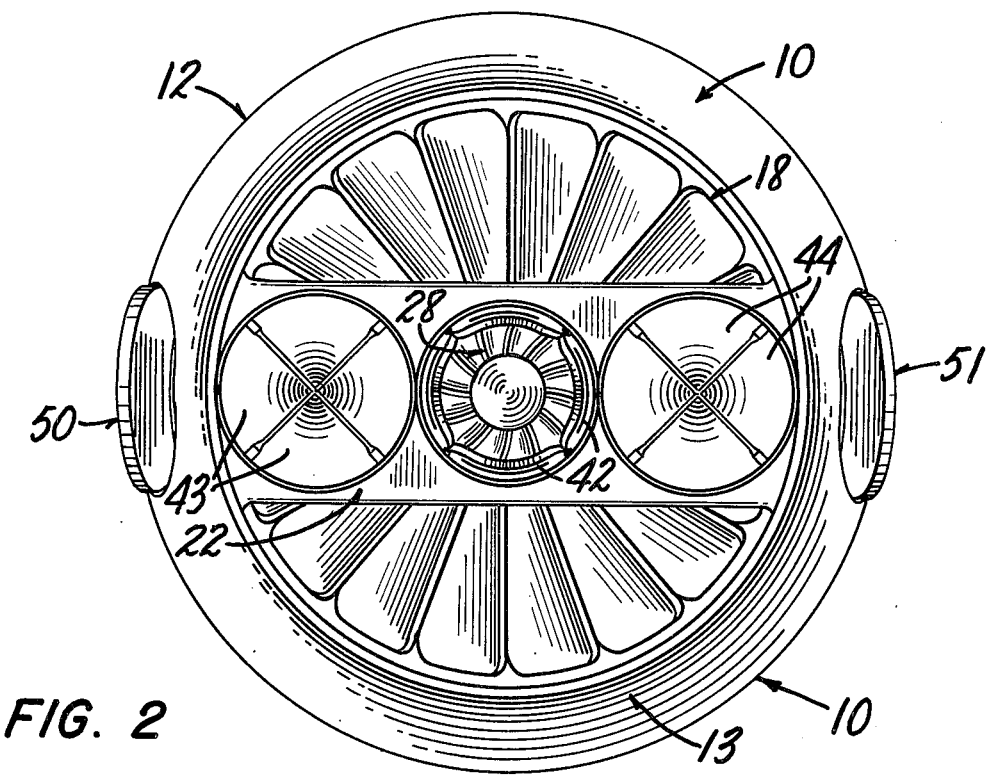
FIG. 2 is a tail end view of the jet propulsion engine assembly of FIG. 1.

Since it may be desired to provide door means at the tail ends of all three of the jet engines 14, 15, and 16, such as those proposed at 42, 43, and 44, it will be noted from FIGS. 1 and 2 that such downstream door means of the central jet engine 14 remains open for exit of the jet power from this central engine, while the downstream doors 43 and 44 of the flanking engines 15 and 16 are closed simultaneously with their upstream door means 40 and 41 upon attaining inoperative conditions of these flanking engines. It is to be understood that these now closed downstream door means 43 and 44 of the flanking jet engines 15 and 16 will be opened up simultaneously with their respective upstream door means 40 and 41. This is likewise true with respect to the upstream door means 39 of the central jet engine 14 and its downstream door means 42, which will be simultaneously opened and closed alternately as the firing conditions dictate.

It will be noted from FIG. 1 that each of the longitudinal shafts 29, 33, and 34 of the central and flanking jet engines 14, 15, and 16 are suitably connected through disengagable clutches 31-32, 131-132, and 231-232 and suitable gearing to the impeller shaft 20. For example, closed disengagable clutch 31-32 drivably connects the driven shaft 29 of the firing central jet engine 14 to the impeller shaft 20 so that the impeller is driven by this activated central engine. The clutches 131-132 and 231-232 of the flanking engines 15 and 16 respectively have become automatically disengaged by virtue of the shut down or deactivation of the flanking jet engines 15 and 16. It will be noted that in the drive of the impeller assembly in housing section 12 the impeller shaft 20 is not only connected to the central jet engine shaft 29 through the closed clutch assembly 31-32, but also carries, fixed thereto, a suitable spur gear 45 which is meshed with suitable gear trains including spur gears 46 and 47 which are respectively connected for drive to the flanking engine shafts 33 and 34 through the clutches 131-132 and 231-232 when engaged and such flanking engines are fired. Accordingly, any one or two of the three jet engines when firing may drive the air intake impeller.

Assuming that the intake air impeller is being driven by the central jet engine 14 with the flanking jet engines 15 and 16 shut down and the upstream doors of the latter 40 and 41 closing off the entrance ends of the latter, it may be desirable to have provided and to use air escape outlets which extend laterally through the longitudinal tubular housing or nacelle shell 10 for escape of pressurized air therethrough directly to the outside atmosphere. For this purpose side air escape ducts 48 and 49 may be provided for such communication to the outside air of the pressurized air within the nacelle shell. It will be noted from FIG. 1 that when either one or both of the flanking engines 15 and 16 are shut down its or their upstream door means 40 and 41 is or are in the closed positions indicated. Thus one door shell or leaf on the outer side of each may be suitably shaped so that when it is pivotally swung to the open position, such as that indicated in broken lines at 140 and 141, they will close off the air escape outlets 48 and 49. It may also be desirable to provide the lateral air escape outlets 48 and 49 with manipulative fairing means, such as pivoted and spring-biased covers 50 and 51, so that they may be respectively or simultaneously swung to outward positions of opening of the air escape outlets 48 and 49.

The tail end view in FIG. 2 of the jet propulsion engine of FIG. 1 illustrates the rotor impeller assembly 18 is conventional form and as though the rotary blades thereof could be viewed from such rear position on opposite sides of the fixed transverse bridge 22 within the nacelle casing 100 which supports structure of the central and flanking engines 15 and 16 as well as the central engine 14 and the impeller rotor assembly. The holing through of bridge 22 shown in FIG. 1 is omitted herein as unnecessary to an understanding of its service.

In FIG. 3 it is illustrated that the end of the tail pipe of the central engine 14, which is indicated in FIG. 1 as extending downstream appreciably farther than the ends of the tail pipes of the flanking engines 15 and 16, may be foreshortened so that all three are substantially in the same transverse plane. This can be advantageous particularly if such a jet propulsion engine assembly is mounted as a pod engine mounting upon a wing of an airline or transport plane to avoid heating up such a rearwardly extending tail section of the central jet engine by the temperatures of the exhausts from the tail pipes of the flanking jet engines. Having all of the exhausts of the plural engines in the same transverse plane may make pod mounting easier.

It is proposed in FIGS. 4 and 5 that the nacelle shell be of such construction as to permit fairing skin 100 to form a continuation of the surface of the tail section 13 so as to close in the rear end of the engine assembly with exposure only of the downstream door means 42 of the central jet engine 14 and those at 43 and 44 of the flanking jet engines 15 and 16 in a smooth tapering streamlined manner. It is illustrated in FIG. 4 that the central jet engine 14 and the flanking jet engines 15 and 16 are all diametrically aligned so that these flanking jet engines are at equal angular distances apart, i.e., 180°.

It is also indicated in FIG. 5 that additional flanking engines may be provided and, in fact, may be multiplied up to a limit dictated by the space available within the longitudinal tubular housing or nacelle shell 10. Thus three flanking jet engines may be arranged about the central jet engine at substantially equal radial angles apart, such as about 120°, as is indicated in FIG. 5. The extra flanking jet engine which has downstream closing doors 144 may be similar in all respects to the flanking jet engine which has downstream closing doors 44, which in turn may be equivalent to the flanking jet engine which has downstream closing doors 43. If, as is indicated in FIG. 5, all three of the flanking jet engines are arranged annularly at substantially equal angular distances about the central jet engine that has its gas turbine 28 located centrally of the construction each preferably will have associated therewith air escape outlets that can advantageously be covered by suitable manipulative fairing covers indicated at 50, 51, and 151. As is therein indicated the downstream section 13 of the housing may be provided with fairing skin 100 similar to that indicated in FIG. 4 and described above.

An annular zone of the front end of the engine nacelle, preceding the air compressor therein, may be provided with an annular series of air intake slits, which may be rectangular with their long dimensions arranged annularly, or they may be of other suitable shapes. Each of these slit openings could be controlled by a rectangular door that automatically opens to increase the area of air intake when sudden surges of power demand occur on takeoff and landing. These slits can be closed by their doors automatically at a certain increased altitude. The opening of these doors can prevent engine stalling due to insufficient air supply upon sudden increases of power demand. These doors may have their upstream sides hingedly supported and their downstream sides dropped down into the interior nose space upon the increased demand for suction therethrough of the additionally required air. Thus, the engine assembly may be equipped with a variable geometric intake to feed larger air supply to the engines and also to reduce this supply when internal airflow stabilizes.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is the novel subjects matter defined in the following claims.

1. A jet propulsion engine assembly for aircraft embodying a longitudinal tubular housing for serving as an enclosing pod or nacelle and having an open, air intake nose, in combination with (1) an axial airflow impeller supported longitudinally in the interior of and by said housing having an annular array of rotary blades supported therein upon a rotatably supported longitudinal and generally central shaft to force air from the intake nose longitudinally back toward the tail end of said housing;

(2) a central jet engine within said housing having a longitudinal drivable shaft substantially aligned with said impeller shaft and drivably connected thereto by disengagable clutching means for effecting drive of the latter from the former when said engine shaft is power driven by said central engine;

(3) a plurality of flanking jet engines also having longitudinal drivable shafts arranged within said housing substantially equally offset laterally from said central engine while being annularly spaced substantially equal radial angles apart with their shafts also connected to said impeller shaft by independent disengagable clutching means whereby each said flanking engine and said central engine may be selectively disengaged from said impeller shaft independently of the others;

(4) means longitudinally subdividing the space within said housing downstream of said means connecting said impeller shaft to the shafts of said plurality of jet engines into a plurality of separated longitudinal spaces which individually house said jet engines; and (5) each of said jet engines having associated with its longitudinal drivable shaft upstream of this engine and downstream of said airflow impeller an individual cooperative upstream airflow door means appreciably to close off airflow from said impeller back through the longitudinal housing space of this engine upon termination of combustion in the latter.

2. The jet propulsion engine assembly defined in claim 1 characterized by each of said central and flanking jet engines being of the gas turbine type with its longitudinal shaft being driven by its turbine.

3. The jet propulsion engine assembly defined in claim 1 characterized by each of said jet engines having associated with its longitudinal housing space downstream door means adapted to be manipulated between airflow open and closed conditions substantially simultaneously with its upstream airflow door means.

4. The jet propulsion engine assembly defined in claim 1 characterized by said tubular housing being provided in the near vicinity of said upstream airflow door means of each of said flanking engines with an air escape outlet extending laterally therethrough to direct communication with outside air for flow of impeller air out therethrough upon closure of said upstream door means.

5. The jet propulsion engine assembly defined in claim 4 characterized by said upstream airflow door means of each of said flanking engines having a manipulative section which in one position closes the associated air escape outlet and simultaneously opens the flow passage from said impeller back through this particular flanking engine.

6. The jet propulsion engine assembly defined in claim 4 characterized by each of said lateral air escape outlets having manipulative fairing means associated therewith to cover it exteriorly when said upstream airflow door means of the flanking engine, with which said escape outlet is associated, is open with closure thereby of the escape outlet.

7. The jet propulsion engine assembly defined in claim 1 characterized by said engine assembly tubular housing having its tail end closed off by fairing skin except for the downstream ends of said jet engines with the latter communicative to the atmosphere therebehind through openings in said fairing skin.

8. The jet propulsion engine assembly defined in claim 1 characterized by the downstream exhaust ends of said plurality of longitudinal engine housing spaces located substantially in the same transverse plane effectively avoiding lateral transfer of exhaust heat from one to exhaust structure of another that may otherwise extend farther downstream from that one.

* * * * *